United States Patent

[11] 3,588,830

[72] Inventors William J. Duda
Binghamton;
Lewis M. Terman, South Salem, N.Y.

[21] Appl. No. 698,567
[22] Filed Jan. 17, 1968
[45] Patented June 28, 1971
[73] Assignee International Business Machines Corporation
Armonk, N.Y.

[54] SYSTEM FOR USING A MEMORY HAVING IRREMEDIABLE BAD BITS

5 Claims, 8 Drawing Figs.

[52] U.S. Cl. .......... 340/172.5
[51] Int. Cl. .......... G06f 11/00
[50] Field of Search .......... 340/172.5; 235/157

[56] References Cited

UNITED STATES PATENTS

| | | | |
|---|---|---|---|
| 3,245,049 | 4/1966 | Sakalay | 340/172.5 |
| 3,331,058 | 7/1967 | Perkins, Jr. | 340/172.5 |
| 3,350,690 | 10/1967 | Rice | 340/172.5 |
| 3,351,905 | 11/1967 | Kramer | 340/172.5X |
| 3,436,734 | 4/1969 | Pomerene et al. | 340/172.5 |
| 3,422,402 | 1/1969 | Sakalay | 340/172.5 |

*Primary Examiner*—Paul J. Hennon
*Assistant Examiner*—Harvey E. Springborn
*Attorneys*—Hanifin and Jancin and George Baron ABSTRACT: A system is set forth for utilizing batch fabricated memories despite the presence of permanently unusable bits in such memories. In addition to a main bulk memory, there is provided an error correction memory which stores the location and correct information to be substituted for each bad bit in the main bulk memory and which may be manufactured by the same technology employed to make the main bulk memory. When the bulk memory is accessed, the error correction memory is accessed simultaneously. The output of the error correcting memory is scanned for an indication of one or more bad bits in the simultaneously accessed bulk memory word. If no indication is found, the bulk memory word is correct as it stands; if one or more indications are found, the location of the bad bits in the bulk memory word and their corresponding correct information bits are inserted into the accessed bulk memory word.

INVENTORS
WILLIAM M. DUDA
LEWIS M. TERMAN

BY [signature]
ATTORNEY

Patented June 28, 1971 3,588,830

3 Sheets-Sheet 3

SYSTEM FOR USING A MEMORY HAVING IRREMEDIABLE BAD BITS

BACKGROUND OF THE INVENTION

Computer systems are designed to process data errorlessly at ever increasing rates. Storage units that store the data to be processed by such systems must have larger and larger capacities, yet not increase appreciably in volume and cost. To solve this apparent paradox, computer manufacturers are making batch-fabricated memories; that is, many storage units having densities of the order of many thousands per square inch are deposited, etched, printed, or otherwise applied to a substrate. Many such batch fabricated units will compose a memory system. In any manufacturing technique involving the construction of very small-sized elements that must have similar properties and close tolerances, a certain percentage of those elements will be unusable or irremediably bad. When it is envisioned that batch-fabricated memories of the future will be capable of storing $10^9$ or more bits of information, yet not be unduly large in volume, it is evident that batch fabricated units should not be scrapped because of the presence of unusable storage bits.

Many schemes have been devised to employ large memory arrays despite the presence of such permanently bad bits therein. U.S. Pat. Nos. 3,222,653 and 3,350,690 to R. Rice and 3,245,049 to F. E. Sakalay are representative of some of the solutions to the above noted problem. However, in many of the proposed solutions, an auxiliary memory contains corrected words for those words in main memory that include permanently bad bits. This auxiliary memory must consist of perfect bits so that when the main memory is addressed and reveals a bad word, the corrected word from the perfect auxiliary memory is substituted for it.

In the present invention, the auxiliary memory can be manufactured in the same technology as the main memory, and thus can also have bad bits.

In the present invention, a main bulk memory is conceptually divided up into a number of word blocks. A much smaller auxiliary memory, manufactured by the same technology, is assigned the task of identifying all bad bit locations within the main memory and the true information content of each such bit. This is accomplished by associating a given portion, such as a word, of the auxiliary memory to identify all bad bit locations within a given block of words in the main memory and their true information content. Both memories must be previously tested and all bad bit locations previously identified. The portion of the auxiliary memory, such as a word, set aside to correct a particular block of words in the main memory is then broken up into specified fields containing a given number of bit positions. Each field of the auxiliary memory word contains the word address location within the main memory block, the bit location within that word of main memory which is bad, a bit location for storing what the true information contents of that bit should be, and a group of bits which are used to mark or "flag" the field as to whether bad bits appear within the field itself.

In operation, if a word within a main memory block is addressed for readout, the block address for main memory is utilized to access the word in the auxiliary memory set aside to identify and correct bad bits within that block. The contents of the main memory word is read out into a main memory register while the contents of the identified auxiliary memory word is read out into an associative memory. The contents of the associative memory are addressed by that portion of the main memory address which identifies the word address within the given block of words and by internal association on the flag-bit field.

The flag-bits within each error correcting field of an auxiliary memory word is utilized to signify whether a bit within that field is bad. Since, as indicated previously, both the main and auxiliary memory are tested previously to determine which bits are bad, if a bit within a predetermined error correcting field is bad, the flag-bits are set in a predetermined binary state, such as two bits set in the binary "0" state. If all bits within the error correction field are good, the flag-bits are set in a different predetermined binary state, such as two bits set in the binary "1" state. Thus, association within the associative memory is done on the word address and the flag-bits in the predetermined state such as two binary "1"s. The choice of at least two "flag-bits" is considered necessary, since one of the bit positions utilized within the "flag" may itself be bad. Thus, if an association is achieved with respect to a word address and flag-bit condition within the associative memory, at least the contents of the field identifying the bad bit location within the main memory word and the correct information which that bit should contain is read out from the associative memory into an auxiliary memory register. The bit location is then decoded to allow access to that particular location in the main memory register and the correct information read into that bit location.

If these memories are of the destructive type, as herein contemplated, then the associative memory is of the nondestructive type so that the information contained in the associative memory may be rewritten back into the auxiliary memory.

It is easily seen then that in a write cycle of operation, the process of identifying the correct information bit contents is reversed. That is, it is assumed that the contents of the information to be read into the main memory are correct. Accordingly, upon addressing the main memory, the correct information to be read into that word of main memory is read into the main memory register. In the meantime, the auxiliary memory is addressed by main memory word block address to read out an auxiliary word into the associative memory which has its contents associated upon by the word address as described above for read out of information. Assuming there is a match within the associative memory, then the matched field is read out of the associative memory into the auxiliary memory register. At this time, the correct word information is stored in the main memory register, while the auxiliary memory register contains information regarding the location of the bad bit in the main memory word which is to be written into, along with information regarding the prior setting of this bit. The bad bit location is decoded and the setting of this bit position in the main memory register is read out and gated into the information bit position in the auxiliary memory register. The contents of the main memory register are than read out into its correct location in main memory, while the contents of the auxiliary memory register are read out into the associative memory and the contents of the associative memory are then read out into the correct location within the auxiliary memory.

It is an object of this invention to employ a novel scheme for using a batch fabricated memory despite the presence therein of permanently bad bits.

It is another object to use a novel error correcting scheme wherein error correction relies on direct rather than indirect addressing.

It is a further object to use an auxiliary memory for storing both the address and the corrected information of a bad bit in memory, wherein the auxiliary memory is manufactured by the same batch fabrication technique employed for making the main memory.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
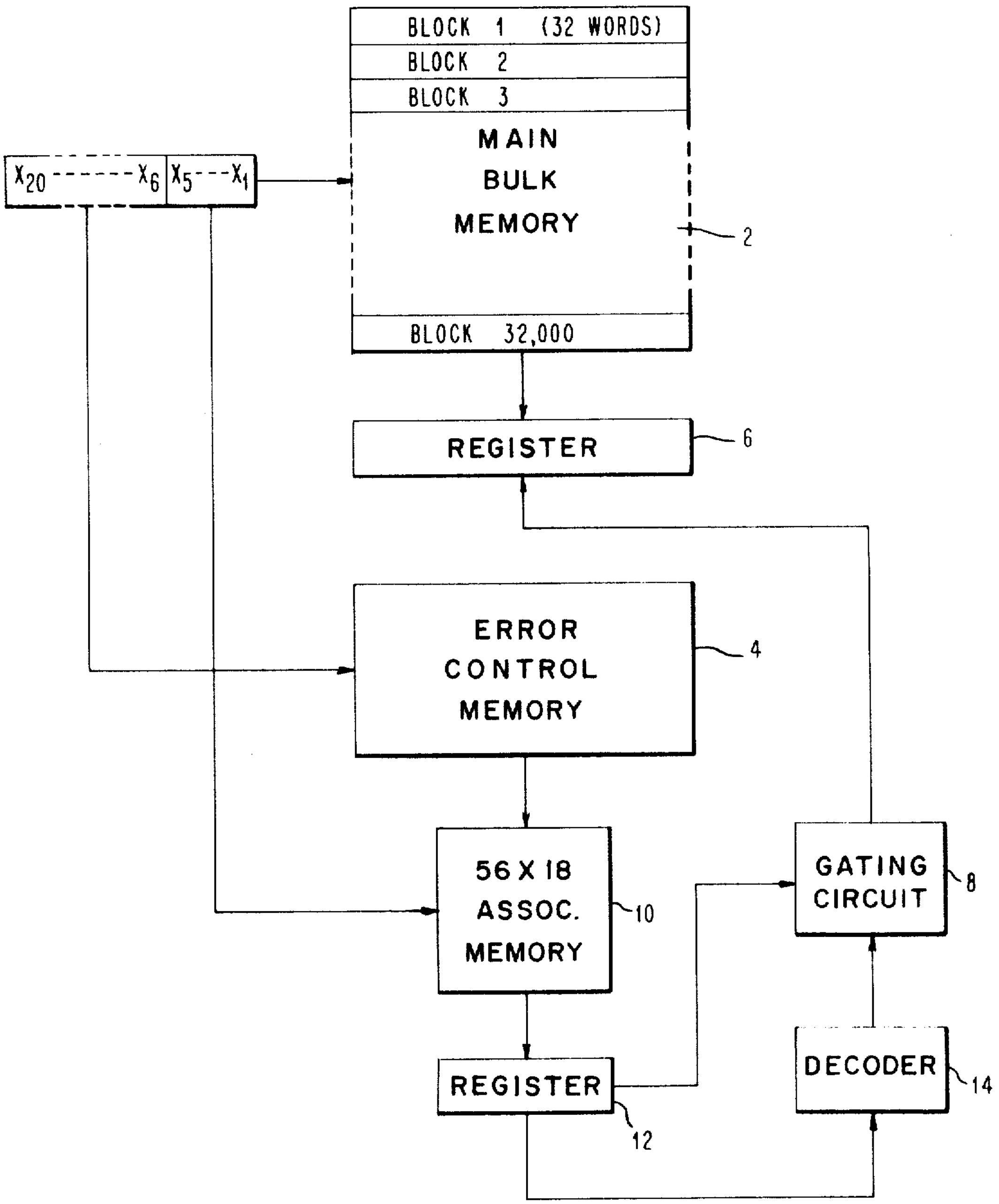
FIG. 1 is a schematic drawing of an embodiment of the system employed for using a memory having permanently bad bits therein.

In the embodiments employed to illustrate the invention, it will be assumed that the main bulk memory (MBM) 2 is a batch fabricated large array memory having approximately 1 billion or $2^{30}$ bits, consisting of $2^{20}$ words of $2^{10}$ bits each. It will be further assumed that memory 2 has a bad bit rate of $2^{110}$, and that the location of these permanently bad bits is known.

The error control memory (ECM) 4 has a capacity of $2^{15}$ words of $2^{10}$ bits each, and is manufactured in the same technology as the MBM2 and subject to the same bad bit rate. Associated with MBM2 is a register 6 for storing words read out of the MBM2 as well as information from a gating circuit 8. An associative memory 10 is employed to store the word read out of the ECM4, and to compare the appropriate bits from the ECM4 error correction fields to the corresponding low order address bits of the MBM2 address field. Register 12 and decoder 14 complete the components employed in the novel error correcting scheme.

The ECM4 stores the location and correct information for each bad bit in the MBM2. The MBM2 is divided into blocks of 32 or $2^5$ words. Thus, there is one word in the ECM4 for each block of words in the MBM2. The error correction fields in an ECM4 word consists of eighteen bits. Five bits determine which word in the 32 word block contains the bad bit. Ten bits determine which bit in the $2^{10}$ bits of the MBM2 word is the bad bit. One bit contains the correct information for the bad bit. Two bits are used to flag error correcting fields which themselves contain bad bits so that such fields will not be used. There can be as many as $1024/18 \simeq 56$ error correcting fields in an ECM4 word. Thus, up to 56 bad bits in a block of main memory can be corrected.

In reading, the MBM2 is accessed with a twenty bit address word. At the same time the ECM4 is accessed with the fifteen high order bits from the MBM2 address word. The error correcting fields in the addressed ECM4 word are then scanned in the associative memory 10 for a comparison between their five bit word address and the five low order bits of the MBM2 address. At the same time the flag bits are scanned to eliminate usage of error correcting fields with bad bits. If no comparison is found, the MBM2 word is correct as it stands, and the word may be processed normally. If one or more comparisons are found in the associative memory 10, then the appropriate ten bits in the comparing fields are decoded by decoder 14 to find the location of the bad bit in the MBM2 word, and the correct information bit from the field is inserted in the appropriate position in register 6. If there is more than one comparing field in the ECM4 word, the fields are treated sequentially, although in the case of duplicate hardware, this would not be necessary.

The associative memory 10 is a register capable of accepting $56\times18=1008$ bits from the ECM4 in parallel, and is wired as an $56\times18$ associative memory for the comparison function and provides output signals indicative of comparisons. In each eighteen-bit word in the associative memory 10, only five word address bits and two flag bits are associated on, while the remaining eleven bits may be read out but are not associated upon. After a comparing field has been read out into register 12, the proper ten bits are transmitted to the decoder 14, and hence to gating circuit 8, and the correct information bit is transmitted to gating circuit 8, which then inserts the bit in the proper location in register 6. Correct information bits and their respective locations in MBM2 are sequentially read out of the AM10 through register 12 until the last comparing field is processed. A suitable indicator, well known in the art, accompanies the last "compare" output signal from the AM10 so as to indicate that the process of correcting bad bits has terminated and the output MBM2 word in register 6 is now correct.

Figure 6:
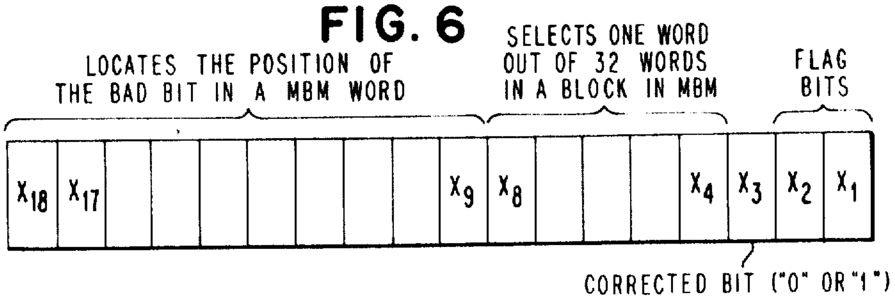
FIG 6 is a similar showing of an error correcting field in auxiliary or error correcting memory.

Since the ECM4 itself may contain bad bits, the seventeenth and eighteenth bits, shown as $X_1$ and $X_2$ of the ECM4 field in FIG. 6, are used as flag bits. Both of these bits are set to the "1" state if the field is good (i.e., contains no bad bits), and both are set to the "0" state if the field contains a bad bit. Since the ECM4 contains bad bits, a flag bit itself may be bad; thus two flag bits are used to greatly reduce the chance of falsely indicating that a bad field is good. Since the location of bad bits is known by tests made after fabrication, a batch fabricated unit having bad bits so distributed that one or more error correcting fields would have both flag bits erroneously indicating a field to be good would not be used in ECM4, but could be used in MBM2, where no such limitation exists.

Since flag bits may be bad, there also exists the chance of flagging otherwise good error correction fields as bad. If this occurs, the number of usable fields in a word of ECM4 is reduced. The probability of this occurring in more than a few fields is statistically insignificant.

A 1024 bit word of ECM4 can correct up to 56 bad bits in a 32 word block of MBM2. The number of errors in a block will be approximately normally distributed, with a mean of $p \times n$, where $p=2^{110}$ and $n=2^{15}$. Thus, the number of errors in a block will have a mean of $2^{5}$, a standard deviation $= \sqrt{pqn} = \sqrt{10^{13}(0.999)\times32\times10^{3}} = 5.66$ Since 56 bad bits can be corrected, the maximum number of errors that can be handled lies more than four standard deviations from the mean. Thus errors in a 32 word block will virtually never overflow the ECM word even if several good error correction fields are falsely tagged as bad. To eliminate possible overflow problems due to clustering of failures as a result of a fabrication problem during the manufacture of the MBM2, the words in a 32 word block need not be located together physically.

In the write operations, the word to be stored in the MBM2 can be written in the normal manner. Simultaneously, the error control memory 4 is accessed and scanned for bad bits in the word to be stored in MBM4. If there are none, the word stored in MBM2 is correct, and the write cycle is complete. If there is one or more bad bits in the MBM2 word, the proper information bits must be inserted in the corresponding error correction field, and the word rewritten into ECM4.

It is understood that the scheme presented here can be used for bad bit rates other than that presented in the preferred embodiment. A higher bad bit rate could necessitate a decrease of the block size of MBM2; a lower bad bit rate could require an increase of the block size and thus could alter the relative size of ECM4 to that of MBM2. For example, doubling the bit rate would halve the block size and double the size of ECM4 relative to that of MBM2. It also could affect the number of flag bits necessary in the error correcting fields.

READ/WRITE CYCLES OF THE ERROR CORRECTING SYSTEM

Figure 2A:
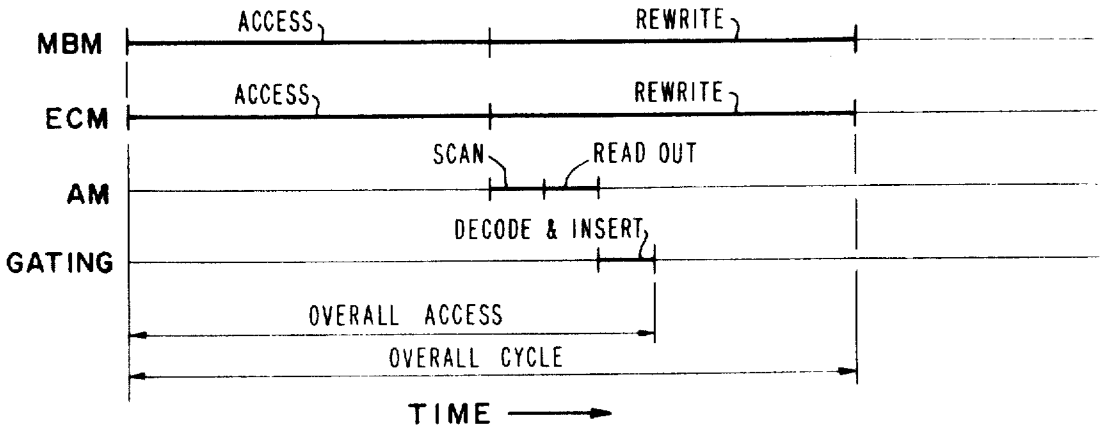
FIGS. 2*a*, 2*b* and 2*c* are timing diagrams showing a read cycle for the error correcting scheme of FIG. 1 employing a destructive readout technology for both main memory and auxiliary memory.
Figure 2B:
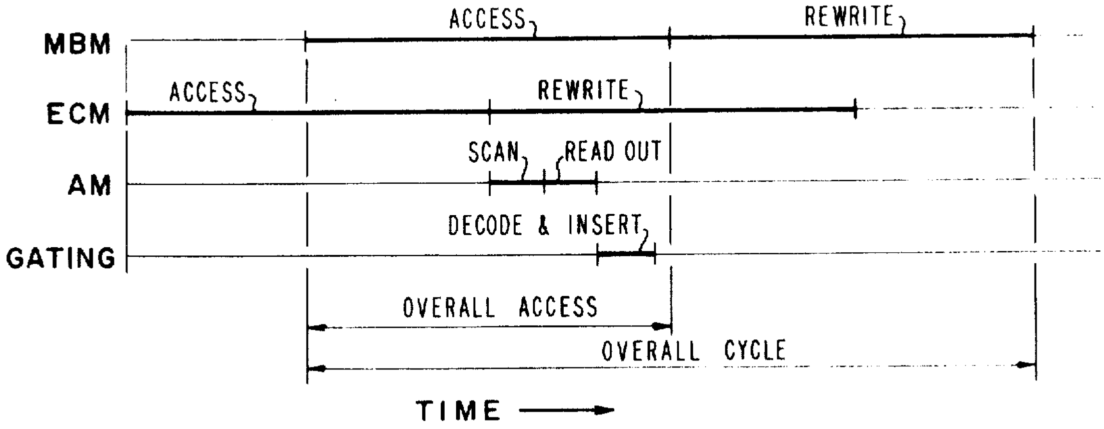
Figure 2C:
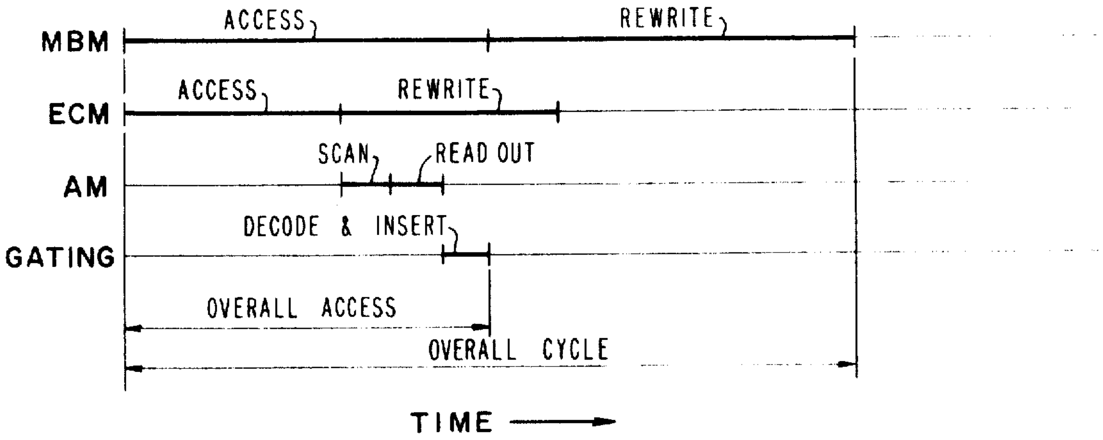

Since the MBM2 and the ECM4 are manufactured by the same technology, they should have the same access and Read/Write Cycle times; whereas the AM 10 scan and error correction processes are accomplished at logic speeds and will be considerably faster than such access and R/W Cycle times. As seen in FIG. 2*a*, if MBM2 and ECM4 are accessed simultaneously, the access time of the MBM2 is lengthened by the scan and error correction portion of the cycle, but the read cycle time will not be changed. If, as in FIG. 2*b*, the system organization chosen to carry out the invention permits the ECM4 to be accessed ahead of the MBM2, the error correcting information could be available when the MBM2 word arrives, thus keeping the access time unchanged. Finally, if the ECM4 can be accessed much faster than the MBM2, perhaps due to the smaller size of the ECM4 or by using faster circuitry, then the scan and corrective times following access of ECM4 would be partially or totally concealed by the longer access time of MBM2, where ECM4 is not accessed prior to MBM2. FIG. 2c shows how the read access of cycle times can be maintained under such conditions.

Figure 3:
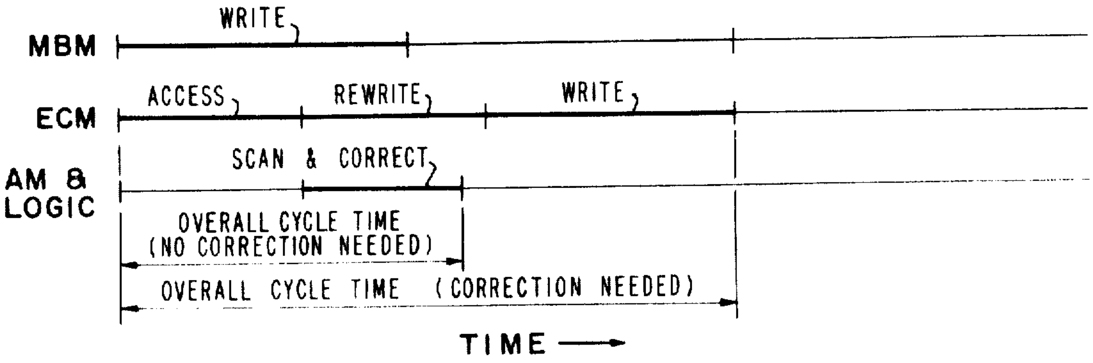
FIGS. 3 and 4 show similar timing cycles for variations of write cycles in the embodiment of the invention shown in FIG. 1
Figure 4:
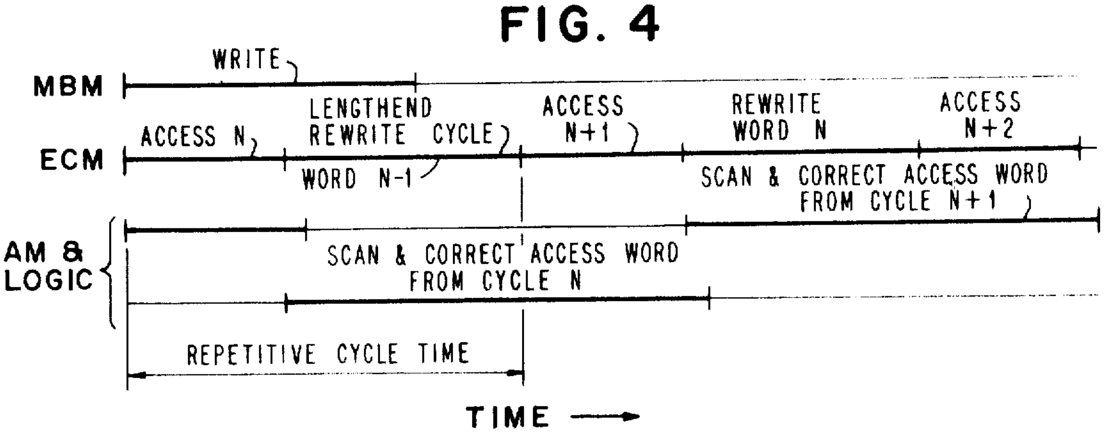
Figure 5:
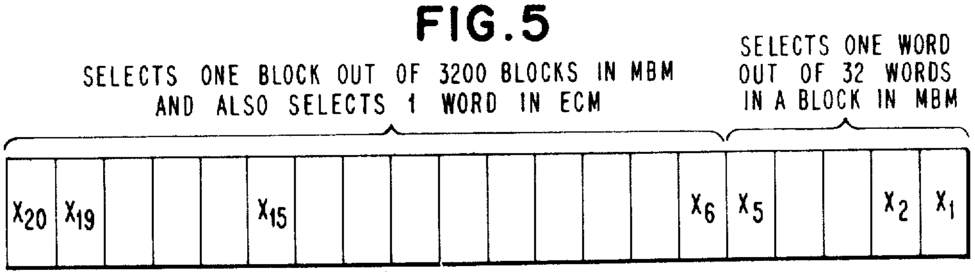
FIG 5 is a showing of an address word for the main memory.

In the write cycles set out in FIGS. 3 and 4, it is assumed that the MBM2 and ECM4 technology relies upon a destructive readout scheme, and that a write cycle is shorter than a read cycle, and the latter consists of an access and a rewrite cycle. The scan and correct cycles will be comparatively fast.

In FIG. 3, where the MBM2 and ECM4 are built by the same technology, the write cycles are started simultaneously. It is seen that the average write cycle of the error correcting scheme will be lengthened by the time for accessing ECM4, the associative memory scan, the insertion of the proper bit or bits into the error correction field(s), and the rewriting of a corrected bit for ECM4 for the bad bit in the MBM2. About one third of the time, the addressed MBM2 word will have no bad bit and the time needed to write the corrected ECM4 word will not be needed. In those cases where the information bit(s) stored in the ECM4 are identical with the correct information bit(s) in the MBM2, there will be no need for a rewrite cycle. Consequently, less than half of the time a single rewrite cycle will be necessary to store one or more corrected information bits.

FIG. 4 illustrates yet another timing cycle, requiring additional hardware, that reflects a way to reduce the write cycle of the MBM2 to approximately the read cycle of the ECM4. In order to attain the benefits of the time cycle of FIG. 4, the corrected ECM4 word obtained in cycle N would be rewritten into the ECM4 on cycle N+1 ECM4 word. The ECM4 word and its address would be stored in a second associative memory (not shown) and the rewrite cycle would be lengthened because a new address would have to be accessed. However, the overall operation would be faster because the scan and information insertion on the ECM4 word cycle could be done at the saMe time that the previous cycle word was being rewritten. Such suggested changes relate to alternating the speed of making a correction when a permanently bad bit must be corrected, but they do not alter the basic invention shown and described herein.

The correction scheme set forth has certain desirable characteristics. Firstly, the ECM4 is made in the same technology as the MBM2 and is smaller than it so that the increased overall memory cost is not high. Secondly, the MBM2 operates with the full 1024-bit word, allowing for maximum bit transfer rate. Only individual bad bits are corrected; good bits are not affected. Thirdly, the system can be made to operate with no penalty in read performance and an acceptable penalty in write cycle time. Additionally, the use of an associate memory 10 facilitates the scan of an ECM4 word and permits rapid detection and correction of bad bits in the MBM2 word. Bad bit rates less than $10^{13}$ can be handled easily and will require a smaller main memory than 2 30 bits. Bad bit rates greater than $10^{13}$ can be processed with no change in the size of ECM4, as long as the number of errors in a given 32 word block does not exceed the number of available error correction fields. Finally, the principles of operation of the invention are not limited to bad bit rates of $10^{13}$. If a greater bad bit rate exists in MBM2 and ECM4, the number of words in the MBM2 which are corrected by a single word in the ECM4 can be reduced, for example, to six, eight, or even less. The size and cost of the ECM4 in such cases will increase correspondingly, but even with a bad bit rate of $10^{12}$, the ECM4 will be about 25 percent the capacity of MBM2, which is tolerable. It is noted that the AM 10 and related control hardware does not increase with the bad bit rate.

Accordingly, to more specifically illustrate operation of the system, assume the main memory MBM2 has certain information stored in a given block of words, such as Block 01, as indicated in the table below. Further, assume that certain bit positions within the block of words are known to be bad, as indicated by an E and subscripted to denote different bad bits. For the purpose of illustration, not all bit positions are shown, nor all words within the block of words. It will be assumed that the remainder of bits not shown contain "0"-bit information as, for example, in the "word bits" for the word address within the word block of MBM2 shown below. Here the two left bit locations are not indicated.

MAIN MEMORY (MBM2)

| | (1) | (2) | (3) | (4) | (5) | (6) | (7) | . . . (N) |
|---|---|---|---|---|---|---|---|---|
| Word bits | Memory Contents | | | | | | | |
| 001 | 1 | $E_1$ | 0 | 0 | 1 | 1 | 1 | . . . 0 |
| 010 | 1 | 1 | 0 | 0 | $E_2$ | 0 | 1 | . . . 0 |
| 011 | $E_3$ | 1 | 1 | 1 | 1 | 1 | 1 | . . . 0 |
| 100 | 1 | 1 | 1 | 1 | 0 | 0 | 1 | . . . 0 |
| 101 | 0 | 0 | $E_4$ | 1 | 1 | 0 | 1 | . . . 0 |
| 110 | 1 | 1 | 1 | $E_5$ | 0 | 0 | 1 | . . . 0 |
| 111 | 0 | 0 | 1 | 0 | 1 | 0 | 0 | . . . 0 |

Further, assume that the control memory ECM4 describes the bad bits identified in MBM2 as is illustrated below, where a partial content of a word of ECM4 assigned to word Block 01 of MBM2 described above is shown. It should be noted that although the partial contents of a word of the ECM4 illustrated below is indicated in the form of columns and rows, each horizontal row of bits defines a particular field of eighteen bits within a single word row of ECM4.

| Bad bit described | Error control memory contents: Address word | | | Location within word | | | Corr. bit | Flag bits | |
|---|---|---|---|---|---|---|---|---|---|
| | (N-15) | (N-14) | (N-13) | (N-6) | (N-5) | (N-4) | (N-3) | (N-1) | (N) |
| $E_1$ | 0 | 0 | 1 | 0 | 1 | 0 | 1 | 1 | 0 |
| $E_1$ | 0 | 0 | 1 | 0 | E | 0 | 1 | 0 | 0 |
| $E_1$ | 0 | 0 | 1 | 0 | 1 | 0 | 1 | 0 | 1 |
| $E_1$ | 0 | 0 | 1 | 0 | 1 | 0 | 1 | 1 | 1 |
| $E_2$ | 0 | 1 | 0 | 1 | 0 | 1 | 1 | 1 | 1 |
| $E_3$ | 0 | 1 | 1 | 0 | 0 | 1 | 1 | 1 | 1 |
| $E_4$ | 1 | 0 | 1 | 0 | 1 | 1 | 1 | 1 | 1 |
| $E_5$ | 1 | 1 | 1 | 1 | 0 | 0 | 1 | 1 | 1 |

For purposes of illustration, assume that the information of word 01 in Block 01 of MBM2 is addressed for read out. The sequence of operation is as follows:

a. MBM2 is accessed and word 01 at address 001 is read out into Register 6 which now contains:

| | | | | | | | | |
|---|---|---|---|---|---|---|---|---|
| Bit position | (1) | (2) | (3) | (4) | (5) | (6) | (7) | . . . (N) |
| Word | 1 | $E_1$ | 0 | 0 | 1 | 1 | 1 | . . . 0 |

It should be note that the error bit E could read out as a "1" or a "0."

b. Referring to FIG. 2A, ECM2 is also addressed by that portion of the address bits (X20 through X6) required to access the words in Block 01 of MBM2, to read out the contents of the word in ECM2 which is assigned to correct errors in the particular block of words in MBM2 which is addressed. This word content is read out into the Associative Memory 10 such that each eighteen -bit field of the word is registered in a horizontal row as indicated in the above table depicting the information in ECM4 for a particular block of words in MBM2.

c. Utilizing address bits X5 through X1, the Associative Memory 10 is then scanned, as indicated in FIG. 2A, to determine if any similar addresses are registered within Associative Memory 10 indicating a bad bit in the MBM2 word addressed. As part of the address being sought, two binary "1"s are added internally within Associative Memory 10 to the address for the purposes of identifying errors within a field of the ECM4 word as will be explained subsequently. Referring to the above table for the contents of ECM4, the first row defines the address for word 01 as does the second, third and forth. At the same time as the addresses within Associative Memory 10 are being associated upon, the contents of the flag-bits are also associated upon to determine whether any bit within that field is in itself bad. For a detailed discussion of associative or content addressed memories reference should be made to an article entitled "Associative Memories—A Many-Pronged Design Effort," by Alan Corneretto, in Electronic Design, Feb. 1963, pages 40+, published by Hayden Publishing Co., New york, N.Y. For control purposes, each of the flag-bits (N–1 and N) must indicate a stored binary "1" to indicate no bad bits. If either of the flag-bits are in a binary "0" state, a bad bit within the EMC4 field is "flagged" and that field is passed over. The use of two bit positions in the flag position is required since there is always the possibility that a position which is predetermined to denote the flag may itself be bad. The chances that two consecutive flag-bits are bad are considered minimal. Hence, if one bit position of the flag-bits is bad and could be read as either a binary "0" or binary "1," the other bit position provides the reliability. Of course, if greater reliability is required, three or four bit positions could be designated for the flag, which would only require a slightly greater capacity for the control memory ECM4. Returning again to the first row of the above table for the contents of the error correcting memory, since the flag-bits (N–1) and (N) indicate a binary "1" and a binary "0," respectively, this information is passed over as an internal address mismatch.

The second horizontal row, or field in Associative Memory 10 is seen to include an error E or bad bit position which is indicated or marked by both flag-bits (N–1) and (N) being in the binary "0" state. The internal addressing within Associative Memory 10 again indicates a mismatch for this field and passes on to the third field. The third field which was stored in ECM4 and read out into Associative Memory 10 indicates a mismatch within the flag-bit control field and is also passed over. The fourth field indicates a match, not only within the address portion, but also within the flag-bit portion, since both flag-bits (N–1) and (N) are in the binary "1" state. The whole contents of this field or just the contents of location and correcting bit information could then be read out into Register 12. For the purpose of illustration, assume only the location and correction bits are nondestructively read out. Register 12 would then contain the following:

| (N−12) . . . (N−6) | (N−5) | (N−4) | (N−3) |
|---|---|---|---|
| 0 | 1 | 0 | 1 |

d. The field (N–12) through (N–4) is used by Decoder 14 to indicate that bit 02 is in error, while (N–3) is utilized to indicate what that bit should contain. Information as to what bit position is bad is sent to Gating Circuit 8 while the particular binary "1" indication from Register 12 is gated through Gate 8 to bit 02 in Register 6. From this example, it is obvious that if word 04 (address 100) of a given block of words in MBM2 were accessed during the read cycle, since no error bits are indicated in the above table denoting its partial contents, upon association in Associative Memory 10 of the different fields within the particular word of ECM4 related to the particular word block in MBM2, there would be no match. Hence, the Register 10 would contain all binary "0"s which would be decoded into a zero position which does not exist in Register 6. This then would indicate that the information contents of Register 6 is correct as it stands.

e. Referring again to FIG. 2A, during the scan portion of the read cycle, both MBM2 and ECM4 are conditioned for rewrite of its information contents back into their particular positions within the respective memories. During this conditioning, Associative Memory 10 is read out and its information contents returned back into the particular word position of ECM4 from whence it was originally stored. After the decoding and gating operations have been completed to correct the information contents of Register 6, both Registers 6 and 10 may be read out and reset so that the information contents of Register 6 may be utilized elsewhere and returned to the word position of MBM2 where it was originally stored.

With respect to the Table above indicating the information contents of the different error correcting fields in the word of ECM4, since the first three fields indicated error bits and they would never be utilized, there remains the question of how these fields could ever have the proper word address in the first place. This is possible since, as indicated previously, ECM4 is first tested to determine if any bit within that field is bad. Once it is determined that a particular bit is bad the "flag-bits" are appropriately written into and, of course, that portion of the word again tested. During this operation, the different bits are switched to different information states and once a bit found to be in error, there is no longer a need to "reset" these bits since the field will never be employed. Hence, the first three fields illustrated in the above Table of information contents of a word portion of ECM4, indicate a possible condition which may exist. Here it may be seen that in the first field, all bits except one of the "flag-bits" (N–1) were good. Therefore, the other "flag-bit" (N) was set in the binary "0" state. In the second row, corresponding to the second field within the word of ECM4 an error was detected and the "flag-bits" appropriately set. It should be noted also, that a bit within the address word location could also have been bad and could indicate either a binary "1" or a binary "0," in which case the "flag-bits" would both be set to binary "0." The third field just illustrates the fact that a different "flag-bit" could be in error. Again, once a bad bit is identified with a portion of the field, it is noted by proper setting of the "flag-bits" and no further testing is done, other than test of the flag-bit indication. Accordingly, information could be left in the bad fields of the ECM4.

Next, consider a write cycle immediately following the read cycle in which new information is to be inserted into the word of the MBM2 previously read out. Referring to FIG. 3, both MBM2 and ECM4 are accessed during the same time and the information to be stored is written into MBM2 and into Register 6. In parallel, the ECM4 word is dumped into Associative Memory 10 and scanned by the five bits of the word address as in a read cycle. The bad bit location information along with the information bit for that word, if it appears in ECM4, is then put into Register 12 at which time the defined bad bit location is decoded and accessed from Register 6 and read into Register 12 and rewritten into Associative Memory 10 during the scan and correction portion of the cycle as indicated in FIG. 3 by the line denoting the Associative Memory and LOGIC portion of the write cycle. The information contained in Associative memory 10 is then written back into the same word location of ECM4.

While the invention has been particularly shown and described with reference to preferred embodiments thereof, it will be understood by those skilled in the art that the foregoing and other changes in form and details may be made therein without departing from the spirit and scope of the invention.

We claim:

1. An error correction system comprising:

a main memory containing a multiplicity of bit storage locations wherein a plurality of said bits are arranged to be addressed by a single word address when such word is within a given plurality of words, said main memory also arranged to be addressed for read in and read out of information by a predetermined word block address, and said main memory having a number of predetermined bit locations within different words which are unusable;

an error control memory having a multiplicity of bit storage locations containing predetermined unusable storage locations, said error control memory organized so that a plurality of said bit storage locations are utilized to represent an error correcting field wherein each error correcting field stores:

a. the location of an unusable bit in said main memory by a single word address and bit location, b. the correct information for such location, and c. information as to whether such field itself is usable, said error control memory also organized so that a plurality of such fields are addressable by said predetermined word block address of said main memory;

a nondestructive read out associative memory connected to said control memory in such a manner as to accept and store all information read out of the error correcting fields of said control memory associated with said predetermined word block address of said main memory and being addressable by a particular single word address of said main memory to interrogate all such stored error correcting fields and nondestructively read out any said field only when the information stored in such field indicates that such field is usable and there is a match between the particular single word address of said main memory and that stored in the error correcting field;

a main memory register for storing a word of said main memory when read out;

an error control register for storing the fields of information read out of said associative memory;

decoding means for decoding the location of the unusable bit location stored in said error control register;

gating means interconnected to said error control register, said decoding means and said main memory register, for gating the correct setting of said unusable bit into said main memory register in the location decoded by said decoding means; and readout address means containing word block and single word address information for applying both word block and single word address to said main memory while applying only block address to said error correcting memory and single word address to said associative memory.

2. The system of claim 1 wherein a plurality of flag-bit locations are provided in each field of said control memory whose joint states indicate whether such field is itself unusable.

3. The system of claim 2 wherein each bit storage location of said main memory is made of magnetic material exhibiting different stable states of magnetic flux remanence.

4. The system of claim 3 wherein each bit storage location of said control memory is made of magnetic material exhibiting different stable states of magnetic flux remanence.

5. The system of claim 1 wherein the ratio of bit storage capacity of said main memory to that of said control memory is at least $2^5$.